(12) United States Patent
Schellhorn et al.

(10) Patent No.: US 7,688,400 B1
(45) Date of Patent: Mar. 30, 2010

(54) LIGHT SOURCE ELEMENT WITH LATERAL, ANGULAR LIGHT INJECTION

(75) Inventors: Franz Schellhorn, Regensburg (DE);
Günter Kirchberger, Sinzing (DE);
Günter Waitl, Regensburg (DE);
Herbert Brunner, Regensburg (DE);
Bernhard Bachl, Regensburg (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 09/868,364

(22) PCT Filed: Dec. 29, 1999

(86) PCT No.: PCT/DE99/04125

§ 371 (c)(1),
(2), (4) Date: Oct. 12, 2001

(87) PCT Pub. No.: WO00/39501

PCT Pub. Date: Jul. 6, 2000

(30) Foreign Application Priority Data

Dec. 29, 1998 (DE) ................................. 198 60 695
Dec. 29, 1998 (DE) ................................. 198 60 697
Dec. 29, 1999 (DE) ................................. 198 60 696

(51) Int. Cl.
*G02F 1/1335* (2006.01)
(52) U.S. Cl. ...................................................... 349/65
(58) Field of Classification Search .............. 349/61–71
See application file for complete search history.

(56) References Cited

U.S. PATENT DOCUMENTS

| | | | | |
|---|---|---|---|---|
| 4,059,916 A | * | 11/1977 | Tachihara et al. ............. | 40/448 |
| 4,277,817 A | * | 7/1981 | Hehr ........................... | 362/31 |
| 5,039,207 A | | 8/1991 | Green | |
| 5,040,868 A | * | 8/1991 | Waitl et al. .................... | 385/33 |
| 5,211,463 A | * | 5/1993 | Kalmanash ................... | 362/26 |
| 5,339,179 A | | 8/1994 | Rudisill et al. | |
| 5,667,289 A | * | 9/1997 | Akahane et al. ............... | 362/31 |
| 5,949,346 A | * | 9/1999 | Suzuki et al. .......... | 340/815.45 |
| 5,986,727 A | * | 11/1999 | Fukui et al. ................... | 349/65 |
| 6,048,071 A | * | 4/2000 | Sawayama ................... | 362/31 |
| 6,092,904 A | * | 7/2000 | Tai et al. ...................... | 362/31 |
| 6,297,908 B1 | * | 10/2001 | Suga .......................... | 359/599 |

(Continued)

FOREIGN PATENT DOCUMENTS

DE     44 04 425 A1    8/1995

(Continued)

OTHER PUBLICATIONS

International Search Report from International Application No. PCT/DE99/04125 dated May 24, 2000.

(Continued)

*Primary Examiner*—Timothy Rude
(74) *Attorney, Agent, or Firm*—Fish & Richardson P.C.

(57) ABSTRACT

A light source element is employed back-lighting of liquid crystal displays and that comprises an obliquely placed light exit face and/or light entry face. At its surfaces, the light waveguide is surrounded by reflectors into which suitable aperture regions are potentially formed. A plurality of light sources and/or a more direct view is provided and, thus, a corresponding increase of the luminance results. A method is also provided for the manufacture of a light source element with an integrated reflector.

33 Claims, 8 Drawing Sheets

U.S. PATENT DOCUMENTS

| | | | |
|---|---|---|---|
| 6,356,389 B1 * | 3/2002 | Nilsen et al. | 359/625 |
| 6,369,867 B1 * | 4/2002 | Ge | 349/73 |
| 6,439,731 B1 * | 8/2002 | Johnson et al. | 362/29 |
| 6,447,134 B1 * | 9/2002 | Takahashi et al. | 362/31 |

FOREIGN PATENT DOCUMENTS

| | | |
|---|---|---|
| DE | 196 52 829 A1 | 10/1997 |
| EP | 0 500 960 A1 | 9/1992 |
| GB | EP-0 798 507 A1 * | 10/1997 |
| JP | 7-21817 | 1/1995 |
| JP | 3025080 | 3/1996 |
| JP | 8-106011 | 4/1996 |
| JP | 8-248420 | 9/1996 |
| JP | 9-113907 | 5/1997 |

OTHER PUBLICATIONS

Patent Abstracts of Japan; Hiramoto Masami, 08248420 Sep. 27, 1996, Liquid Crystal Display Device.

* cited by examiner

LIGHT SOURCE ELEMENT WITH LATERAL, ANGULAR LIGHT INJECTION

BACKGROUND OF THE INVENTION

The invention is directed to a light source element having a light wave guide for back-lighting of liquid crystal displays and for ambient illumination.

One important job in the back-lighting of liquid crystal displays is comprised in illuminating the liquid crystal display area with an optimally uniform, monochromatic or polychromatic light radiation having an adequately high luminance. For this purpose, the light radiation emitted from one or more light sources must, on the one hand, be as uniformly distributed onto the display area as possible, whereby, on the other hand, the losses should be optimally minimized.

EP-A-0 500 960 discloses a planar light source element that is to be utilized for back-lighting in a liquid crystal display. Given this light source element, a light source is arranged at an end face surface as a light entry face of a transparent light waveguide. A surface of the light waveguide that is perpendicular to the light entry face serves as a light exit face, and a light-reflecting layer is arranged at that surface of the light waveguide lying opposite this light exit face. Further, a diffusing element is arranged such that the light emerging from the light exit face is diffusely scattered. The homogenization of the light radiation over the surface of the light source element is then achieved in that one or both surfaces of the light waveguide comprises roughened and plane sections, and the area ratio of the roughed to the plane sections is continuously varied along the waveguide. The plane sections have the property that, due to total reflection, light rays are reflected back into the waveguide, whereas the light rays are scattered at the roughened sections. Since the luminance is initially relatively high at the light entry side of the light waveguide, a relatively high proportion of plane surfaces is set thereat, so that there is a relatively high probability that the light waves in this region will propagate by multiple total reflections in the waveguide. This areal proportion of plane sections is continuously reduced over the course of the waveguide, so that the light radiation can be increasingly scattered at the increasing proportion of roughened surfaces. Generating a relatively uniform output radiation at the light exit face of the light source element is thereby achieved.

Given the described arrangement, the light radiation must be coupled into the light waveguide at an end face of the light source element. Given employment of a fluorescent tube arranged along this side and surrounded by a metallic reflector, an adequate luminance for the back-lighting of a liquid crystal display can presumably be offered in many cases. Nonetheless, this arrangement is relatively inflexible since the luminance cannot be increased above a certain degree due to the limitation in view of the employable light source. Moreover, the attachment of the light source to the lateral end face of the light source element is also unfavorable for space reasons because the space required therefor ultimately limits the width of the display area of the liquid crystal display.

The described arrangement is suitable, for example, for the back-lighting of a liquid crystal display at the dashboard of a motor vehicle. When the display is located relatively far up on the dashboard, the display area is highly visible. When, however, this is arranged relatively far down on the dashboard, the driver or passenger views the display area with a relatively large observation angle. This leads to faulty recognition of the display area, particularly given liquid crystal displays with their great dependency on observation angle.

Given the described arrangement, a foil or film with a vapor-deposited metallic layer is applied as a light-reflecting layer onto the surface of the light waveguide lying opposite the light exit face after the manufacture of the light waveguide. This procedure of applying the film, however, proves to be relatively involved, since the film must generally be glued onto the surface of the light waveguide. An adhesive must be employed for this purpose that should optimally exhibit adequate transparency for a broad wavelength range of the visible spectral range since the light source element should be employable not only for the back-lighting of liquid crystal displays with white light sources but also for monochromatic back-lighting with LEDs having an arbitrary wavelength.

The arrangement disclosed by EP-A-0 500 960 is therefore suitable for a good lighting situation only when certain preconditions are met.

SUMMARY OF THE INVENTION

It is an object of the present invention to create a light source element, particularly for back-lighting of liquid crystal displays, with which an improved luminance can be enabled even given different ambient conditions.

Due to the type of infeed of the light radiation at the end faces of the light waveguide it is also a problem to enhance the luminance given the light source elements known in the Prior Art that have the function of ambient lighting. It is thus a further object of the present invention to create a light source element for ambient lighting that exhibits a higher luminance and/or a larger light exit face.

Another object of the invention is to specify a method for the manufacture of a light source element that enables a high luminance of the light source element.

The above described problems are solved in accordance with the light source element and method according to the invention wherein the light source element is provided with a light waveguide. A light exit face is provided along with at least one light entry face. A surface lying opposite the light exit face and at least some of lateral surfaces connecting the light exit face and the opposite surface are covered with reflectors that at least one of reflect and diffusely return light. The light entry face is formed by a part of at least one of the lateral surfaces and the opposite surface not provided with a reflector and is arranged at an acute angle relative to one of principal directions of extent of the light waveguide.

What all versions of a first embodiment of the present invention have in common is that, differing from the Prior Art, the light radiation is no longer coupled into the light waveguide at one or both end faces but at surfaces that proceed in the longitudinal direction of the light source element, whereby the light radiation is coupled into the light waveguide with an oblique angle. Since there is more space available for positioning the light sources along these surfaces, a plurality of light sources can be provided. This creates the possibility that the luminance of light source element of the invention can be increased.

In all embodiments, the light waveguide is covered with a reflector at least that surface lying opposite the light exit face and at the longitudinal side surfaces connecting the light exit face and the opposite surface, opening regions for arranging light infeed units being shaped as warranted in the reflector.

In a first example of a first embodiment of a light source element of the invention, the light sources are arranged at the longitudinal side surfaces of the light waveguide. A plurality of light sources such as light-emitting diodes or the like can be arranged at the longitudinal side surfaces, and the luminance of the light source element can thus be increased.

In a second example of a first embodiment of a light source element of the invention, the light sources are arranged at the surface of the light source element that lies opposite the light exit side. Such an embodiment serves, for example, as a light source element for ambient lighting.

Such light source elements can, for example, be designed planar and can thus be used in an ideal way for the back-lighting of liquid crystal displays.

Further, such light source elements can be employed for ambient lighting. The damping of the light waveguide is practically suppressed due to the possibility of multiple light input, so that light waveguides of an arbitrary length can be illuminated and employed for lighting the surroundings.

In a second embodiment, the light source element of the invention, comprises a light waveguide with a light exit face, whereby that surface of the light waveguide lying opposite the light exit face is covered with a reflector that reflects or diffusely returns light, and whereby, further, the light exit face and the surface of the light waveguide lying thereopposite describe an angle differing from zero.

Using such a light source element, a lightguide module can be manufactured and mounted in the dashboard of a motor vehicle. Dependent on the height position provided for the lightguide module to be installed, the oblique angle of the light exit face is set during manufacture such that driver or passenger look directly onto the display surface of the liquid crystal display.

In a first embodiment, the method of the invention for achieving the object is characterized in that the application of the reflective film is practically combined with the manufacture of the light waveguide. The light waveguide is manufactured by injection molding in that a transparent plastic is injected into a mold or a cavity of an injection molding apparatus. This mold is previously lined with the film at the bottom surface and at least a part of the lateral surfaces. When curing after the injection molding of the plastic, the film adheres to the light waveguide.

In a second embodiment of the inventive method, the film is manufactured with a deep-drawing process and is subsequently applied to the light waveguide. Preferably, a film comprising a bottom surface and at least one lateral surface is thereby produced in a one-piece form and the light waveguide is subsequently introduced thereinto. For example, the one-piece film can be manufactured in the form of a trough-shaped channel into which the light waveguide can be inserted.

The invention is described in greater detail below on the basis of exemplary embodiments in the drawings.

DESCRIPTION OF THE PREFERRED EMBODIMENTS

Figure 1:
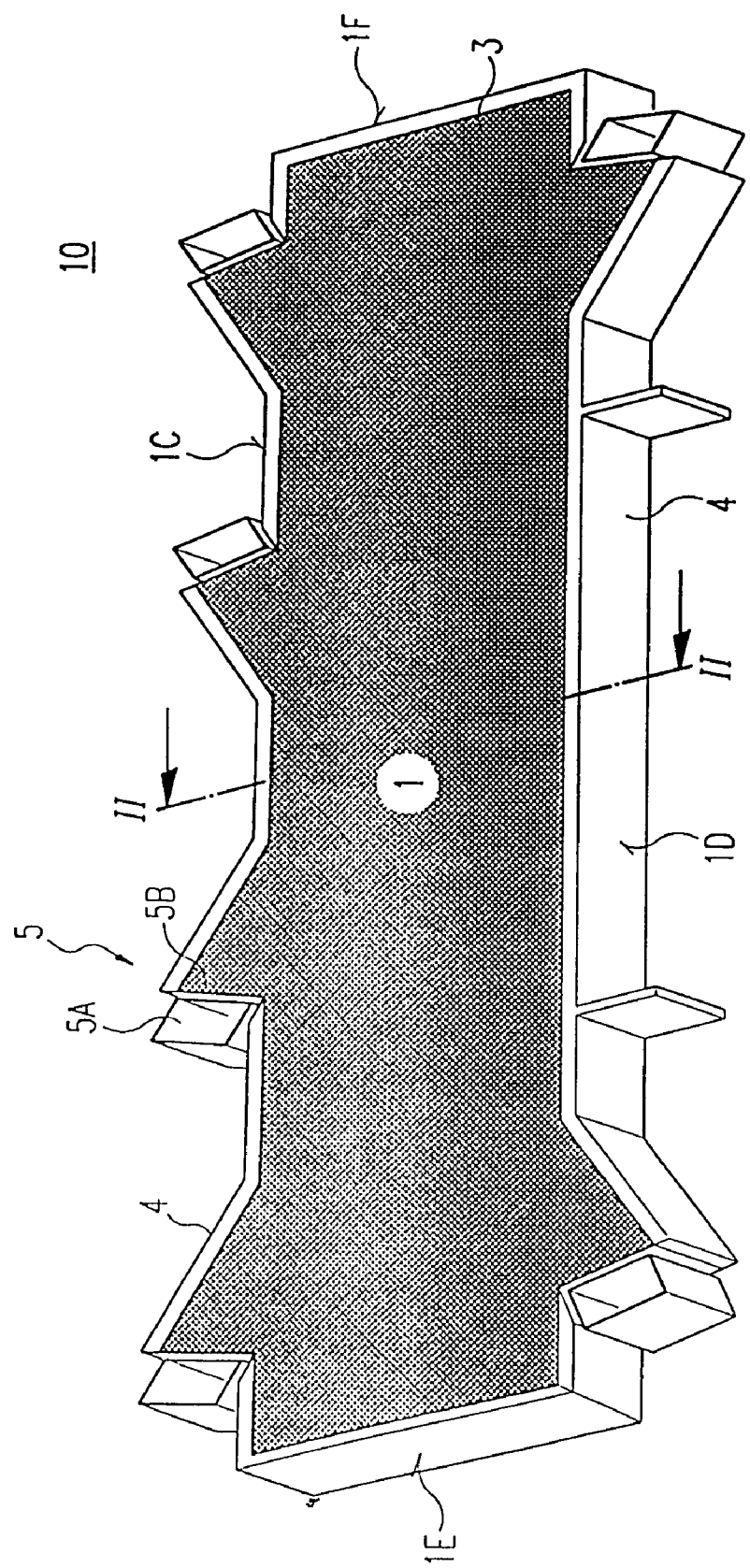
FIG. 1 is a first example of the first embodiment of a planar light source element of the invention for the back-lighting of liquid crystal displays.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
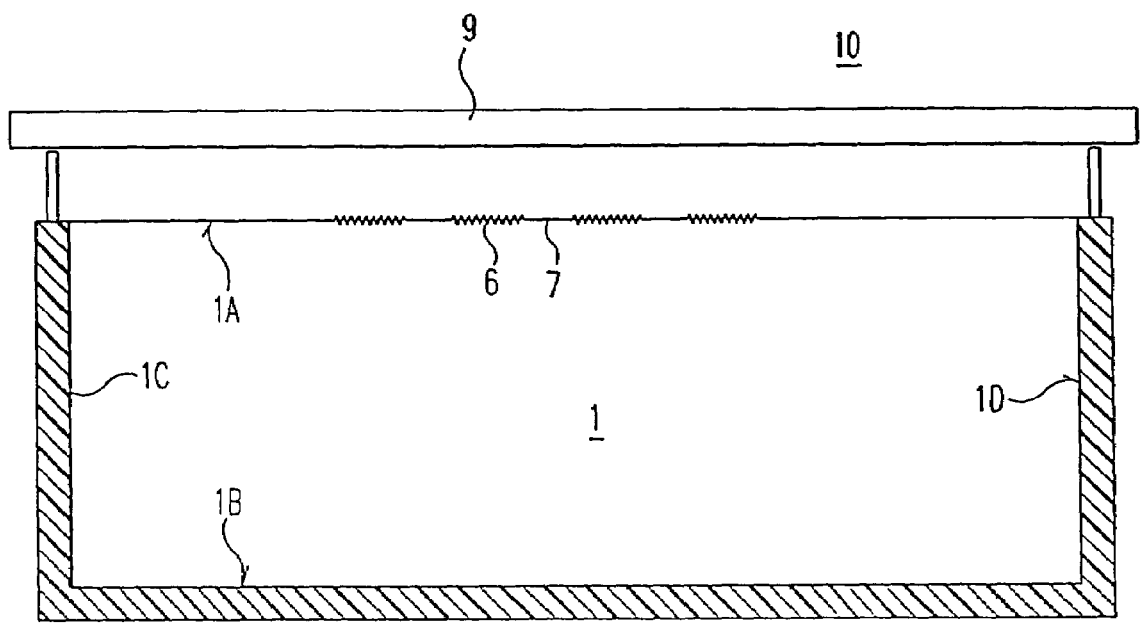
FIG. 2 is a cross-section through the light source element of FIG. 1 along the line II-II.

FIG. 1 shows an embodiment of an inventive light source element 10 that, for example, can be employed for the back-lighting of a liquid crystal display. FIG. 2 shows the light source element in a cross-section along the line II-II in FIG. 1 together with a liquid crystal element.

The core element of the light source element 10 of FIG. 1 is a planar light waveguide 1 that can be fundamentally formed of any transparent material, for example of a thermoplastic resin such as acrylic resin, polycarbonate resin or of plexiglass or PMMA as well. The light coupled into this light waveguide 1 is uniformly distributed over the rectangular surface and is supplied to a display surface (not shown) of a liquid crystal display. For this purpose, the light waveguide 4 is surrounded by reflectors 4 on all sides, the incident light radiation being diffusely cast back by the reflectors 4.

The light infeed occurs via light infeed units 5 that are attached to the longitudinal side surfaces 1C and 1D of the light source element 10 and that respectively comprise of an aperture region 5B of the respective reflector 4 and of a light source 5A. The light source 5A, for example, is a semiconductor light-emitting diode (LED) for a monochromatic back-lighting but can also be a white light source like a halogen lamp or the like. In a specific embodiment, a UV radiation source can be employed, whereby the top and bottom sides of the light waveguide are then coated with a phosphorescent material. The light source 5A is arranged such that the light radiation is beamed into the light waveguide 1 at a specific, oblique angle relative to a principal axis of the light waveguide 1.

FIG. 1 shows an embodiment wherein four light infeed units are attached to the light waveguide 1 at the longitudinal side surface 1C and two light infeed units are attached to the light waveguide 1 at the opposite longitudinal side surface 1D.

The exemplary embodiment of FIG. 1 provides that a triangular projection of the light waveguide 1 is present at every light infeed unit. One lateral face of this projection is covered with a reflector 4, whereas the other lateral face lies free toward the outside and thus forms the aperture region 5B.

In the exemplary embodiment of FIG. 1, the end faces 1E and 1F are also advantageously covered with reflectors so that no light is coupled out at the end faces.

The reflectors 4 are preferably formed of one piece and manufactured of Pocan® (thermal polyester on the basis of polybutyleneterephthalate) by injection molding. This material is white and forms an ideal diffuse reflector. However, it is just as conceivable to apply a film material as a reflector. For example, this can be a film on the basis of polycarbonate that is coated or printed with a white color. In order to make the manufacturing method even simpler, the film could also already be applied during the injection molding of the light waveguide 10 in that the mold of the injection molding apparatus is lined with the film before the injection molding. After the plastic compound cures, the film adheres to the waveguide and can be removed from the injection molding apparatus together therewith.

The homogenization of the luminance is fundamentally produced as in EP-A-0 500 960 with a variable areal ratio of light-scattering and plane surfaces that are formed on the light exit face 1A and/or that surface 1B of the light waveguide 1 lying thereopposite or on both.

Light-scattering surfaces 6 and plane surfaces 7 formed into the light exit face 1A of the light waveguide are indicated in FIG. 2 merely by way of example. The areal ratio of the plane surfaces 7 to the light-scattering surfaces 6 is dependent on the luminance at the respective location in the light waveguide 1. A relatively high areal ratio is set in regions of relatively high luminance in the light waveguide 1, whereas this proportion is set low in regions of relatively low luminance. There are a number of possibilities for the shape of the light-scattering surfaces 6. An especially simple manufacturing method is the production of roughened regions by emerying the respective surface. The surface is comparatively intensively emeried at the locations at which a low luminance is present in order to scatter the incident light. However, the light-scattering regions 6 can also be, for example, small elevations that are applied onto the surface as a point matrix in a designational way. The density distribution in the point matrix can be determined, for example, with a simulation program into which it is essentially the dimensions of the light waveguide 1 and the locations and intensities of the light infeed as well as the reflection conditions that are input.

FIG. 2 additionally shows a liquid crystal element 9 that is arranged above the light exit face 1A of the light waveguide 1 and is separated therefrom by spacers.

Figure 3:
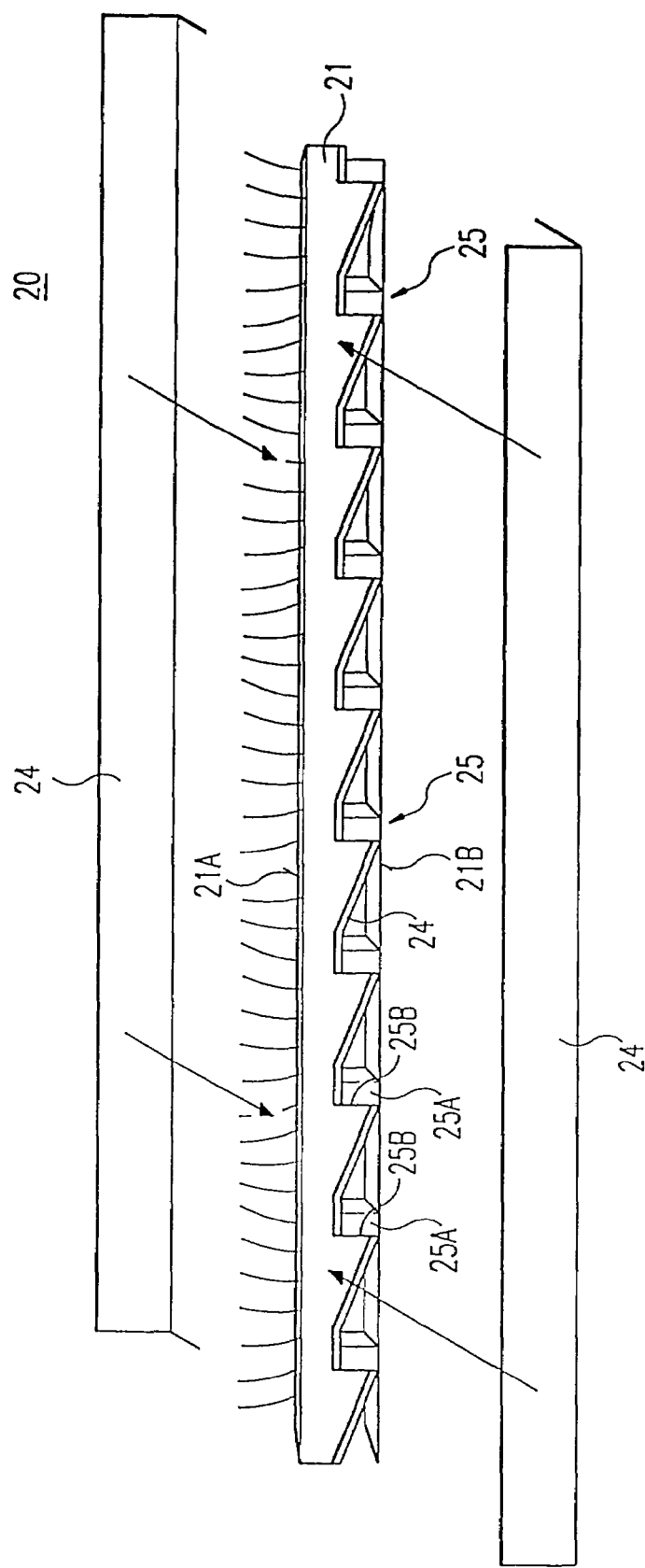
FIG. 3 is a second example of the first embodiment of a light source element of the invention for ambient lighting.

FIG. 3 shows a second exemplary embodiment of an inventive light source element 20 in an exploded view from the side. At the same time, this represents the second embodiment of the invention wherein the light infeed does not occur via the longitudinal lateral faces but via the surface lying opposite the light exit face.

As in the first exemplary embodiment of FIG. 1, the surface 21B lying opposite the light exit face 21A and the longitudinal lateral faces of a light waveguide 21 are covered with reflectors 24. The comments about the first exemplary embodiment apply to these reflectors, i.e. these are preferably formed of one piece, so that they practically form a trough-shaped channel into which the light waveguide 21 is introduced. Aperture regions 25B into which the light waveguide 21 engages with triangular projections are formed in that surface 21B lying opposite the light exit face 21A. Light sources 25A are again arranged in front of these aperture regions 25B such that they are coupled into the light waveguide 21 at an oblique angle relative to a principal or longitudinal axis thereof. The aperture regions 25B in the reflective layer 24 and the respectively corresponding light sources 25A form a plurality of light infeed units 25. The entire surface 21B lying opposite the light exit face 21A is now available for the arrangement of these light infeed units 25, so that a plurality of these can be provided.

In this embodiment, too, light-scattering and plane surfaces can be provided in a variable ratio on the light exit face for homogenization of the light radiation, as was set forth in conjunction with the first embodiment. The light sources can be LEDs or polychromatic white light sources.

The exemplary embodiment shown in FIG. 3 can, for example, be employed as an elongated light source element for the ambient environment. In particular, a plurality of the illustrated units can be arranged following one another in order to produce an arbitrary length.

Figure 4:
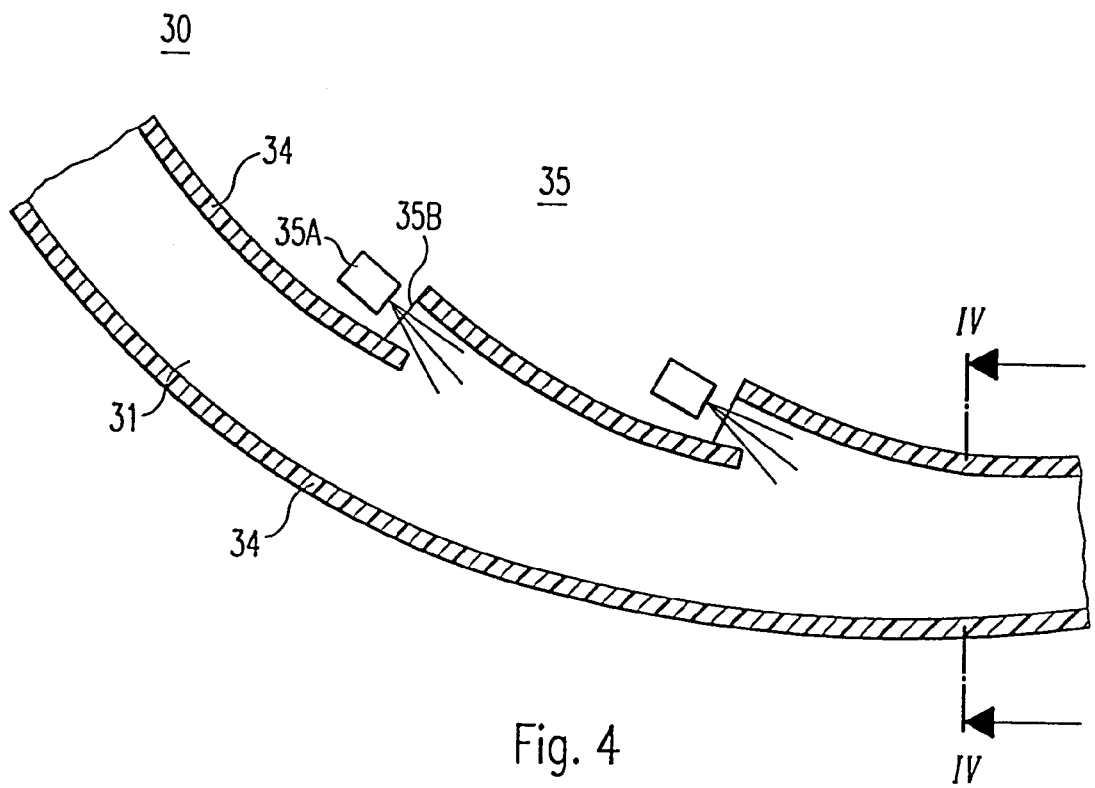
FIG. 4 is a third example of the first embodiment of a light source element of the invention and FIG. 4a a cross-section along a line IV-IV in FIG. 4.

Another exemplary embodiment is shown in FIG. 4. This exemplary embodiment belongs to the first embodiment of the invention since the light is again coupled in here at the longitudinal lateral surfaces of the light source element. A part of the light source element 30, which can fundamentally be shaped with an arbitrary length, is shown. The light source element 30 can, for example, be utilized for ambient lighting.

Figure 4A:
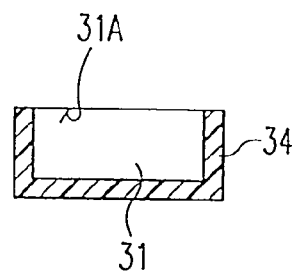

FIG. 4A shows the light source element 30 in cross-section along the line IV-IV in FIG. 4. In accord therewith, the light waveguide 31 comprises a light exit face 31A and is covered with reflectors 34 at the opposite surface and at the longitudinal lateral surfaces. The same statements as provided for the above exemplary embodiments apply to this. The reflector 34 is interrupted along a longitudinal lateral surface in specific aperture regions 35B in front of which light source 35A is arranged such that the light radiation they emit penetrates into the light waveguide 30 at an oblique angle relative to the longitudinal axis thereof. The aperture regions 35B in the reflector 34 and the light sources 35A arranged in front of them form light infeed units 35. As was already the case in the previous exemplary embodiments, the light sources 35 can be formed of LEDs or polychromatic white light sources.

It has proven especially advantageous when the reflector 34 penetrates into the surface of the light waveguide 31 lying free in the aperture region 35B a certain distance therefrom. As a result thereof, the creation of bright hot spots in the light waveguide 31 can be avoided in the proximity of the light source 35. The rounded shape of the obliquely placed reflector surfaces for the formation of the aperture regions 35B also proves beneficial for the light infeed. This is also true of the embodiment according to FIG. 3.

The light attenuation also plays practically no part given this type of light source element, and light source elements of arbitrary shape and length can be formed.

Figure 5:
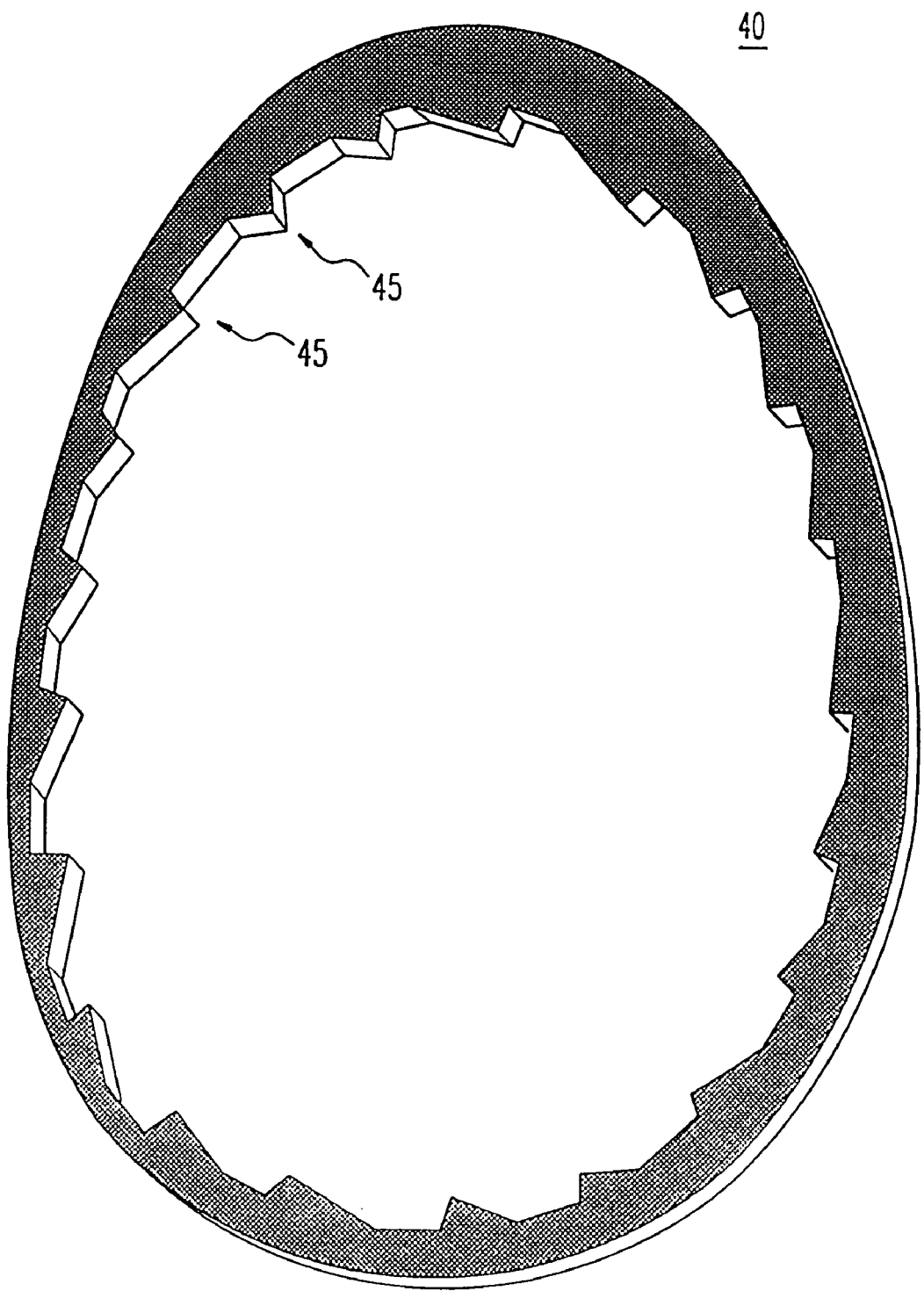
FIG. 5 is a specific form of the exemplary embodiment of FIG. 4.

FIG. 5 shows a specific exemplary embodiment of the light source element shown in FIG. 4. This comprises a closed form, whereby a plurality of successively arranged light infeed units 45 (the light sources are not shown) are provided at its inside circumferential surface. The structure and the configuration of the light waveguide 40 are the same as shown in FIG. 4. The specific shape of the closed ring can be arbitrarily selected.

Figure 6:
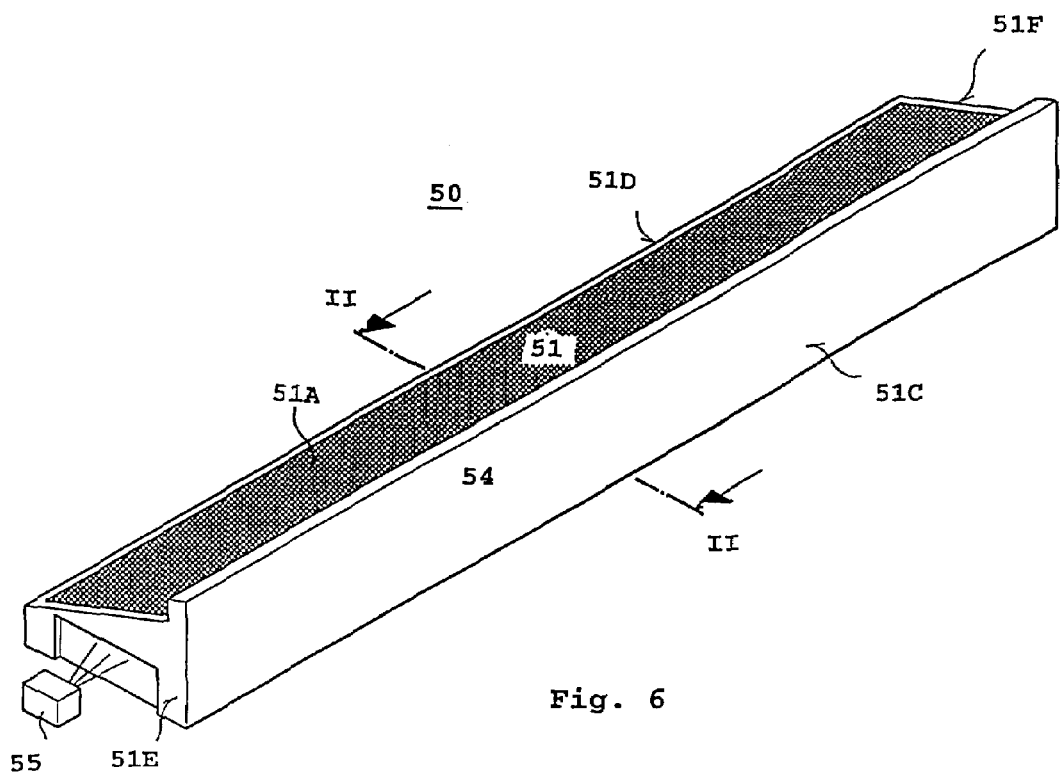
FIG. 6 is a second embodiment of a light source element of the invention for the back-lighting of liquid crystal displays.

FIG. 6 shows an exemplary embodiment of light source elements 50 as potentially employed, for example, for the back-lighting of a liquid crystal display in the dashboard of a motor vehicle.

Figure 7:
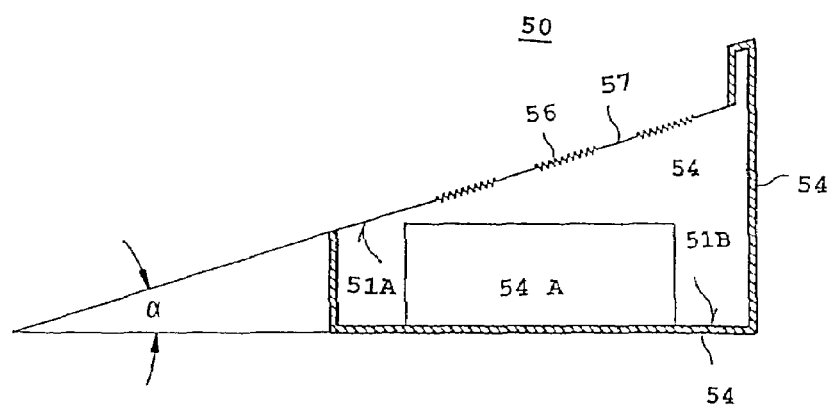
FIG. 7 is a cross-section through the light source element of FIG. 6 along the line II-II.

In FIG. 7, the light source element is shown in a cross-section along the line II-II in FIG. 6.

The core member of the light source element 50 of FIG. 6 is a planar light waveguide 51 that can be fundamentally formed of any transparent material, for example of a thermoplastic resin such as acrylic resin, polycarbonate resin or of plexiglass or PMMA (polymethylmethacrylate) as well. The light coupled into this waveguide 51 from a light source 55, for instance a semiconductor light-emitting diode, is uniformly distributed over the light exit face 51A and is supplied to a planar liquid crystal element (not shown) mounted at a slight distance above the light exit face 51A with spacers. For this purpose, the light waveguide 51 is surrounded on all sides by reflectors 54 with which the incident light radiation is diffusely cast back.

In the exemplary embodiment of FIG. 6, the end faces are advantageously also partly covered with reflectors 54. Apertures 54A for the passage of the light radiation emitted by the light sources 55 are formed therein. However, it can likewise be provided as well that the end faces are not covered by reflectors 54 from the very outset.

The light waveguide 51 comprises such a shape that the plane of the light exit face 51A describes an angle with the plane of the surface 51B lying opposite it. When, therefore, the lightguide module is mounted in the illustrated form at a planar back wall, for example in the dashboard of a motor vehicle, the light exit face 51A and, thus, the liquid crystal element mounted in front of the light exit face 51A as well, is placed obliquely and faces toward an observer. What is thus achieved is that the observer, given a liquid crystal display attached at a lower position of a dashboard, looks perpendicularly onto the display surface, so that the viewing deficiencies that occur given the conventional lightguide modules are avoided.

The reflectors 54 are preferably formed of one piece and are manufactured of Pocan® (thermal polyester on the basis of polybutyleneterephthalate) by injection molding. This material is white and forms an ideal diffuse reflector. However, it is just as conceivable to apply a film material as a reflector. For example, this can be a film on the basis of polycarbonate that is coated or printed with a white color. In order to make the manufacturing method even simpler, the film could also already be applied during the injection molding of the light waveguide 50 in that the mold of the injection molding apparatus is lined with the film before the injection molding. After the plastic compound cures, the film adheres to the waveguide and can be removed from the injection molding apparatus together therewith.

The homogenization of the luminance is fundamentally produced as in EP-A-0 500 960 with a variable areal ratio of light-scattering and plane surfaces that are formed on the light exit face 51A and/or that surface 51B of the light waveguide 51 lying thereopposite or on both.

Light-scattering surfaces 56 and plane surfaces 57 formed into the light exit face 51A of the light waveguide 51 are indicated in FIG. 7 merely by way of example. The areal ratio of the plane surfaces 57 to the light-scattering surfaces 56 is dependent on the luminance at the respective location in the light waveguide 51. A relatively high areal ratio is set in regions of relatively high luminance in the light waveguide 51, whereas this proportion is set low in regions of relatively low luminance. There are a number of possibilities for the shape of the light-scattering surfaces 56. An especially simple manufacturing method is the production of roughened regions by emerying the respective surface. The surface is comparatively intensively emeried at the locations at which a low luminance is present in order to scatter the incident light. However, the light-scattering regions 56 can also be, for example, small elevations that are applied onto the surface as a point matrix in a designational way. The density distribution in the point matrix can be determined, for example, with a simulation program into which it is essentially the dimensions of the light waveguide 51 and the locations and intensities of the light infeed as well as the reflection conditions that are input.

It can also be provided that light source from which light is coupled into the light waveguide 51 are arrangement at both end faces.

Figure 8:
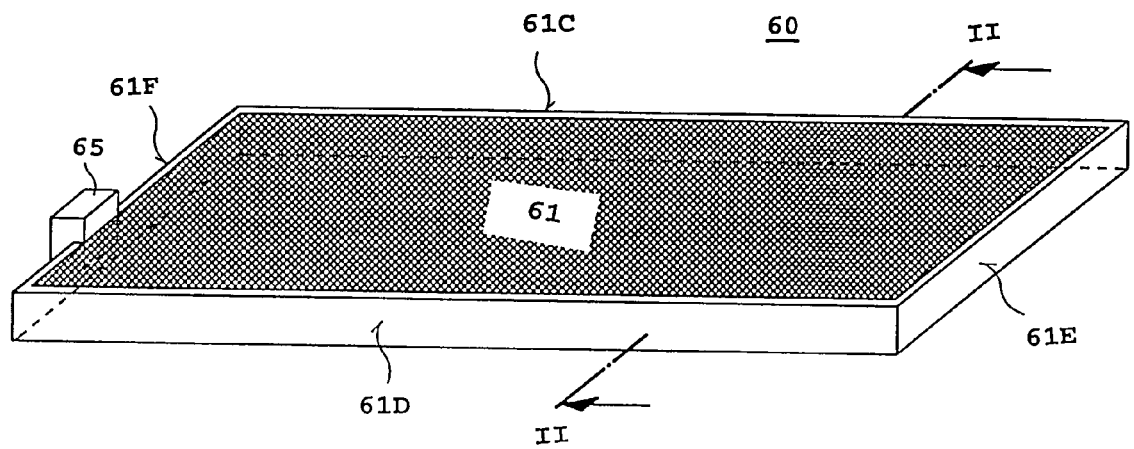
FIG. 8 is a first embodiment of an inventively manufactured, planar light source element.

FIG. 8 shows a perspective view of a further embodiment of an inventively manufactured light source element 60 as potentially employed, for example, for back-lighting of a liquid crystal display.

The core member of the light source element 60 is a planar, cuboid light waveguide 61 that can be fundamentally formed of a transparent material, for example of a thermoplastic casting resin such as acrylic resin or polycarbonate resin. When the light source element is to be manufactured according to the first embodiment of the invention, then the material must be capable of being injection molded.

The light coupled into this light waveguide 61 is uniformly distributed over the rectangular surface and is supplied to a display surface (not shown) of a liquid crystal display. A film 64 with which the incident light radiation is diffusely reflected back into the light waveguide 62 is applied at the surface 61B lying opposite the light exit face 61A as well as to the lateral surfaces 61C and 61D. The light infeed occurs with at least one light source 65 that is arranged in front of at least one of the end face surfaces 61E or 61F of the light source element 60. For example, the light source is a semiconductor light-emitting diode (LED) for a monochromatic back-lighting of the liquid crystal display. The employment of miniaturized LEDs, which can be mounted in SMT technique (surface mounted technique) and have become known under the trademarks SIDELED® and MiniSIDELED®, is especially advantageous. A very flat light source element (lightguide module) can be manufactured by employing such a light source with an extremely flat light waveguide. Fundamentally, however, a white light source such as a halogen lamp or the like can also be employed as the light source.

In the further embodiment, the light waveguide 61 is manufactured with injection molding, whereby the application of the film 64 occurs simultaneously. For that purpose, an injection molding apparatus is employed that contains a form that corresponds to the desired shape of the light waveguide 61, i.e. comprises the shape of a flat cuboid in the exemplary embodiment. This mold, i.e. essentially the bottom surface and the longitudinal side surfaces, are lined with the film 64 before the injection molding. For example, the film can thereby be pulled through the injection molding apparatus as an endless film strip and can be suctioned into the mold by under-pressure. The film is cut off when the apparatus is closed. The injection molding with the plastic material is then implemented. After the curing of the plastic compound in the casting mold, the film 64 adheres to the light waveguide and this can be removed from the injection molding apparatus.

When desired, the film 64 can be applied to all lateral surfaces of the mold. In any case, care must be exercised to see either that no film is provided at the locations at which light sources 65 are to be arranged or that openings of adequate size are formed in the film 64 in an existing film, the light radiation of the light sources 65 being capable of entering into the light waveguide 61 through these.

According to a second aspect of the present invention, the film 64 is manufactured in a deep-drawing process. Preferably, the film 64 is manufactured of one piece with the bottom surface and the lateral surfaces. For example, the film can then be present as a trough-shaped channel into which the light waveguide 61 can be pushed.

The film can be essentially comprise a polycarbonate that is coated or printed with a white color. It can also be composed of a multi-layer structure of a polycarbonate layer, an aluminum layer and the white colorant layer.

Figure 9:
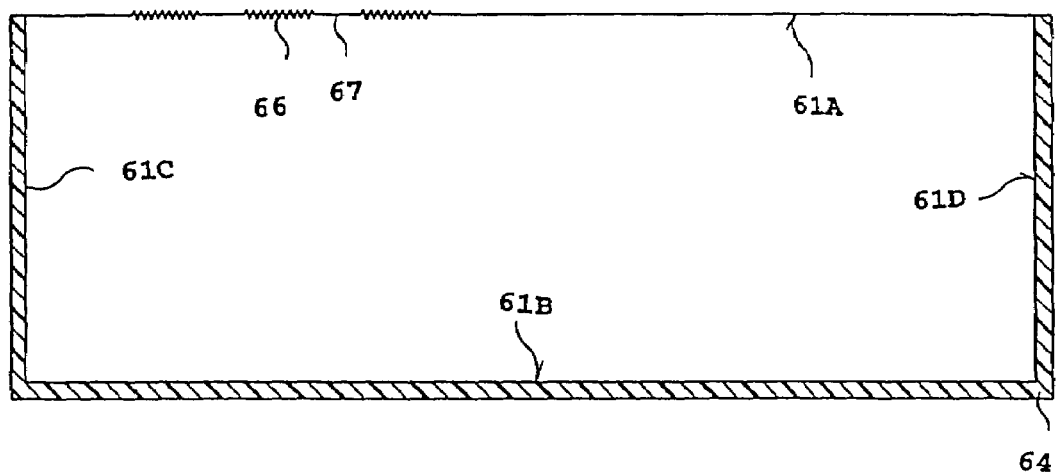
FIG. 9 is a cross-section through the light source element of FIG. 8 along the line II-II.

The homogenization of the luminance is fundamentally produced as in EP-A-0 500 960 with a variable areal ratio of light-scattering and plane surfaces that are formed on the light exit face 61A and/or that surface 61B of the light waveguide 61 lying thereopposite or on both. Light-scattering surfaces 66 and plane surfaces 67 formed into the light exit face 61A of the light waveguide 61 are indicated in FIG. 9 merely by way of example. The areal ratio of the plane surfaces 67 to the light-scattering surfaces 66 is dependent on the luminance at the respective location in the light waveguide 61. A relatively high areal ratio is set in regions of relatively high luminance in the light waveguide 61, whereas this proportion is set low in regions of relatively low luminance. There are a number of possibilities for the shape of the light-scattering surfaces 66. An especially simple manufacturing method is the production of roughened regions by emerying the respective surface. The surface is comparatively intensively emeried at the locations at which a low luminance is present in order to scatter the incident light. However, the light-scattering regions 66 can also be, for example, small elevations that are applied onto the surface as a point matrix in a designational way. The density distribution in the point matrix can be determined, for example, with a simulation program into which it is essentially the dimensions of the light waveguide 61 and the locations and intensities of the light infeed as well as the reflection conditions that are input.

For manufacturing a liquid crystal display, a liquid crystal element is secured to the light source element with spacers above the light exit face 61A.

Figure 10:
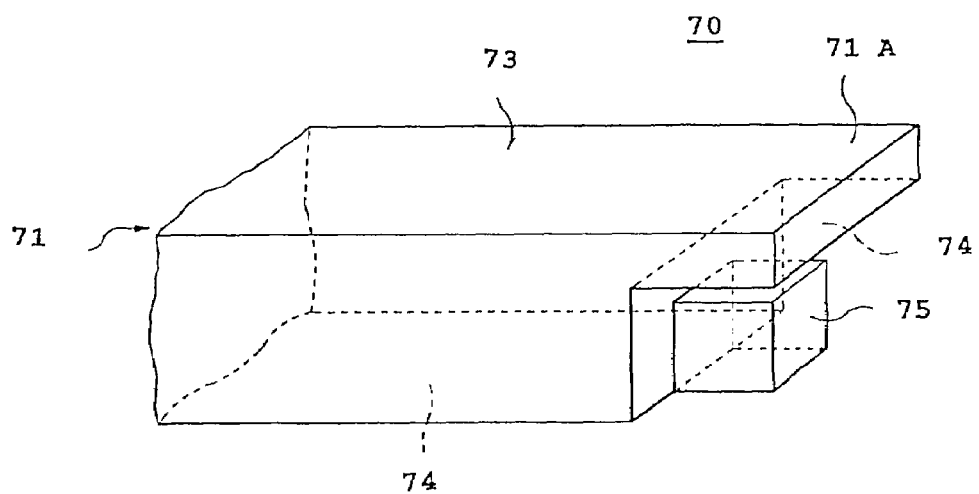
FIG. 10 is a partial view of another embodiment of an inventively manufactured, planar light source element.

FIG. 10 shows a partial view of another exemplary embodiment of an inventive light source element 70 in perspective.

This contains a light waveguide 71 whose one end comprises a projection 71A that is salient beyond the end face surface and aligns with the light exit face 73. A light source is arranged under the projection 71a, so that the space above the light source 75 is additionally used by the projection 71A. The area of the light source element 70 and, thus, the usable display area of the liquid crystal display is sic thus enlarged. The surface of the projection 71A facing toward the projection 71A is likewise covered with the film 74 in addition to the bottom surface and the lateral surfaces. As a result thereof, unwanted light phenomena can be avoided, for example what are referred to as hot spots as frequently occur in the region of the light waveguide immediately above the light source.

For manufacturing a light source element 70 as in FIG. 10, the mold of the injection molding apparatus for the further exemplary embodiment must comprise a corresponding, complementary shape. A corresponding deep-drawing method for manufacturing the film 74 must be applied for the other embodiment.

Although various minor modifications might be suggested by those skilled in the art, it should be understood that my wish to embody within the scope of the patent warranted hereon all such modifications as reasonably and properly come with the scope of my contribution to the art.

The invention claimed is:

1. A light source element, comprising:
   a light waveguide and a light source, the light waveguide having a light exit face and a surface lying opposite the light exit face, the light exit face and the surface lying opposite the light exit face being connected by side faces,
   wherein the surface lying opposite the light exit face and at least some portions of the side faces are covered and contacted with reflectors that at least one of reflect and diffusely return light;
   wherein at least one projection is formed in at least one of the side faces of the light waveguide, each projection extending over less than an entire length of the at least one of the side faces and comprising a portion of the light exit face, a portion of the surface opposite the light exit face, and first and second lateral surfaces connecting said portions of the light exit face and the surface opposite the light exit face;
   wherein the first lateral surface is covered by a reflector and the second lateral surface is not covered by a reflector and is arranged at an acute angle relative to a principal direction of extent of the light waveguide to form a light entry face; and
   wherein the light source is positioned in front of the light entry face.

2. The light source element according to claim 1 wherein light radiation emitted during operation by the light source penetrates into the light waveguide at an oblique angle.

3. The light source element according to claim 1 wherein the first and second lateral surfaces intersect so that the at least one projection has a triangular cross-sectional shape.

4. The light source element according to claim 1 wherein the reflectors are integrally connected to one another.

5. The light source element according to claim 1 wherein a material of the reflectors is capable of being injection molded and the reflectors are manufactured by injection molding.

6. The light source element according to claim 1 wherein a material of the reflectors is formed of a thermoplastic polyester on a base of polybutylene terephthalate.

7. The light source element according to claim 1 wherein a material of the reflectors comprises Pocan®.

8. The light source element according to claim 1 wherein reflectors are formed of one of a reflective and a diffusely back-scattering film.

9. The light source element according to claim 8 wherein the film is formed on a base of polycarbonate.

10. The light source element according to claim 8 wherein at least one opening is formed in the film for passage of light radiation.

11. The light source element according to claim 8 wherein the film is at least one of coated and printed with white color.

12. The light source element according to claim 1 wherein the light source element forms a closed ring.

13. The light source element of claim 1, wherein at least one of the light exit face and the surface lying opposite the light exit face comprise light-scattering sections, the light scattering sections comprising small elevations applied to the surface of the waveguide as a point matrix.

14. The light source element of claim 1, wherein the surface lying opposite the light exit face and all of the lateral surfaces except for the second lateral surface are covered with reflectors that contact the surfaces and at least one of reflect and diffusely return light.

15. The light source element of claim 1, wherein at least one of the light exit face and the surface lying opposite the light exit face comprise light-scattering sections and plane sections, and an area ratio of the plane sections to the light-scattering sections along the light waveguide is set such that a uniform luminance of the light source element is achieved.

16. The light source element of claim 1, wherein the light exit face and the surface lying opposite the light exit face are substantially parallel.

17. The light source element of claim 1, wherein the at least one projection comprises two or more projections each extending over less than an entire length of the at least one of the side faces.

18. The light source element of claim 17, wherein each of the two or more projections comprises a separate light entry face.

19. The light source element of claim 17, wherein at least one of the two or more projections is positioned on a first side of a midpoint of the light waveguide, and at least one of the two or more projections is positioned on a second side of the midpoint opposite the first side.

20. The light source element of claim 19, wherein at least two projections are formed in each of the side faces of the light waveguide, and for each side face of the waveguide, at least one of the at least two projections is positioned on a first side of a midpoint of the light waveguide, and at least one of the at least two projections is positioned on a second side of the midpoint opposite the first side.

21. A liquid crystal display, comprising:
a light source element comprising a light waveguide and a light source, the light waveguide having a light exit face and a surface lying opposite the light exit face, the light exit face and the surface lying opposite the light exit face being connected by side faces; and
a liquid crystal element arranged at a side of the light exit face of the light source element,
wherein the surface lying opposite the light exit face and at least some portions of the side faces are covered and contacted with reflectors that at least one of reflect and diffusely return light;
wherein at least one projection is formed in at least one of the side faces of the light waveguide, each projection extending over less than an entire length of the at least one of the side faces and comprising a portion of the light exit face, a portion of the surface opposite the light exit face, and first and second lateral surfaces connecting said portions of the light exit face and the surface opposite the light exit face;
wherein the first lateral surface is covered by a reflector and the second lateral surface is not covered by a reflector and is arranged at an acute angle relative to a principal direction of extent of the light waveguide to form a light entry face; and
wherein the light source is positioned in front of the light entry face.

22. The liquid crystal display according to claim 21 wherein the liquid crystal element is held spaced from the light exit face by spacers.

23. The liquid crystal display of claim 21, wherein at least one of the light exit face and the surface opposite the light exit face comprises light-scattering sections and plane sections, and an area ratio of the plane sections to the light-scattering sections along the light waveguide is set such that a uniform luminance of the light source element is achieved.

24. The liquid crystal display of claim 21, further comprising a plurality of light sources, wherein the plurality of light sources are coplanar and are positioned in a plane parallel to the surface opposite the light exit surface.

25. The light source element of claim 21, wherein the at least one projection comprises two or more projections each extending over less than an entire length of the at least one of the side faces.

26. The light source element of claim 25, wherein each of the two or more projections comprises a separate light entry face.

27. The light source element of claim 25, wherein at least one of the two or more projections is positioned on a first side of a midpoint of the light waveguide, and at least one of the two or more projections is positioned on a second side of the midpoint opposite the first side.

28. The light source element of claim 27, wherein at least two projections are formed in each of the side faces of the light waveguide, and for each side face of the waveguide, at least one of the at least two projections is positioned on a first side of a midpoint of the light waveguide, and at least one of the at least two projections is positioned on a second side of the midpoint opposite the first side.

29. A light source element, comprising:
a light waveguide and a light source, the light waveguide having a light exit face and a surface lying opposite the light exit face, the light exit face and the surface lying opposite the light exit face being connected by side faces,
wherein the surface lying opposite the light exit face and at least some portions of the side faces are covered and contacted with reflectors that at least one of reflect and diffusely return light;
wherein at least one projection is formed in at least one of the side faces of the light waveguide and the surface opposite the light exit face, each projection comprising portions of first and second lateral surfaces connecting the light exit face and the surface opposite the light exit face;
wherein the at least one projection comprises a light entry face in front of which the light source is positioned, the light entry face being arranged at an acute angle relative to a principal direction of extent of the light waveguide; and
wherein the light exit face and the surface opposite the light exit face are substantially parallel.

30. The light source element of claim 29, further comprising a plurality of light sources, wherein the plurality of light sources are coplanar and are positioned in a plane parallel to the surface opposite the light exit surface.

31. The light source element of claim 29, wherein the at least one projection comprises two or more projections each extending over less than an entire length of the at least one of the side faces or the surface opposite the light exit face.

32. The light source element of claim 31, wherein each of the two or more projections comprises a separate light entry face.

33. The light source element of claim 31, wherein at least one of the two or more projections is positioned on a first side of a midpoint of the light waveguide, and at least one of the two or more projections is positioned on a second side of the midpoint opposite the first side.

* * * * *

UNITED STATES PATENT AND TRADEMARK OFFICE
CERTIFICATE OF CORRECTION

| | | |
|---|---|---|
| PATENT NO. | : 7,688,400 B1 | Page 1 of 1 |
| APPLICATION NO. | : 09/868364 | |
| DATED | : March 30, 2010 | |
| INVENTOR(S) | : Franz Schellhorn et al. | |

It is certified that error appears in the above-identified patent and that said Letters Patent is hereby corrected as shown below:

Cover Page
(30) Foreign Application Priority Data please replace
  "Dec. 29, 1999 (DE) ... 198 60 696" with -- Dec. 29, 1998 (DE) ... 198 60 696 --

Signed and Sealed this

Twenty-fifth Day of May, 2010

David J. Kappos
*Director of the United States Patent and Trademark Office*